(12) United States Patent
Lin et al.

(10) Patent No.: US 11,528,117 B2
(45) Date of Patent: Dec. 13, 2022

(54) BASE STATION CAPABLE OF ALLOCATING CHANNEL-STATE REPORT AND METHOD FOR ALLOCATING CHANNEL-STATE REPORT

(71) Applicant: INDUSTRIAL TECHNOLOGY RESEARCH INSTITUTE, Hsinchu (TW)

(72) Inventors: You-En Lin, Taichung (TW); Jen-Feng Huang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 232 days.

(21) Appl. No.: 17/087,078

(22) Filed: Nov. 2, 2020

(65) Prior Publication Data

US 2021/0050982 A1 Feb. 18, 2021

Related U.S. Application Data

(62) Division of application No. 16/233,300, filed on Dec. 27, 2018, now Pat. No. 10,862,656.

(51) Int. Cl.
*H04L 5/00* (2006.01)
*H04W 72/04* (2009.01)
(Continued)

(52) U.S. Cl.
CPC ......... *H04L 5/0057* (2013.01); *H04B 7/0626* (2013.01); *H04L 1/0026* (2013.01);
(Continued)

(58) Field of Classification Search
CPC ... H04L 5/0057; H04L 1/0026; H04L 5/0051; H04L 5/0037; H04L 5/0092; H04L 5/048; H04L 1/0027; H04L 1/0023; H04B 7/0626; H04B 17/318; H04W 76/28; H04W 76/048; H04W 74/0816; H04W 72/10;
(Continued)

(56) References Cited

U.S. PATENT DOCUMENTS

2017/0118794 A1* 4/2017 Lee ........................ H04L 51/00
2017/0156152 A1* 6/2017 Nazar ................... H04L 1/1671
(Continued)

*Primary Examiner* — Edan Orgad
*Assistant Examiner* — Vanneilian Lalchinthang
(74) *Attorney, Agent, or Firm* — Maschoff Brennan

(57) ABSTRACT

A base station capable of allocating channel status reports includes a memory, a communication module and a processor. The processor is configured to send RRC configuration messages each including a periodic CSI parameter set and a discontinuous reception parameter set to user devices respectively. The periodic CSI parameter set includes a report period, a report time shift and a piece of PUCCH resource information. The RRC configuration messages include the same report period, the same report-time shift and the same PUCCH resource information. The processor is configured to determine one of a plurality of conflicting user devices among the user devices will report a CSI when predicting that the plurality of conflicting user devices will report the CSI simultaneously. The processor is configured to send a sleep instruction to the conflicting user devices except the conflicting user device determined to report the CSI.

10 Claims, 17 Drawing Sheets

(51) Int. Cl.
    *H04W 28/04*     (2009.01)
    *H04B 17/318*     (2015.01)
    *H04B 7/06*     (2006.01)
    *H04L 1/00*     (2006.01)
    *H04W 76/28*     (2018.01)
    *H04W 76/27*     (2018.01)
    *H04W 74/08*     (2009.01)

(52) U.S. Cl.
    CPC ....... *H04W 74/0816* (2013.01); *H04W 76/27* (2018.02); *H04W 76/28* (2018.02)

(58) Field of Classification Search
    CPC . H04W 24/10; H04W 76/27; H04W 72/1263; H04W 72/046
    USPC .......................................................... 370/329
    See application file for complete search history.

(56) References Cited

U.S. PATENT DOCUMENTS

2018/0241533 A1*   8/2018   Loehr .................... H04L 5/0057
2018/0352561 A1*  12/2018   Barabell ........... H04W 72/1263

* cited by examiner

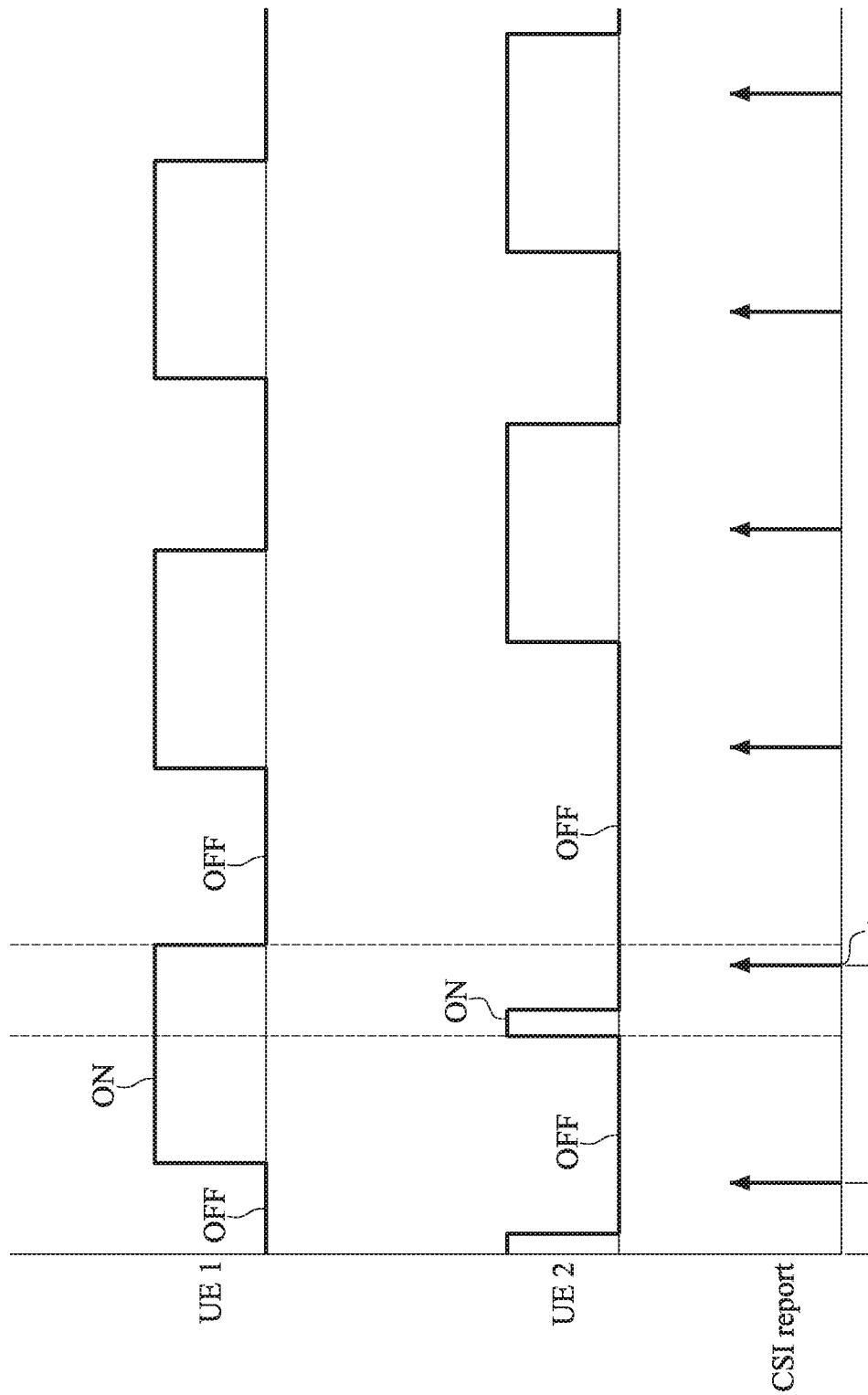

BASE STATION CAPABLE OF ALLOCATING CHANNEL-STATE REPORT AND METHOD FOR ALLOCATING CHANNEL-STATE REPORT

CROSS-REFERENCE TO RELATED APPLICATIONS

This patent application is a divisional patent application of U.S. patent application Ser. No. 16/233,300 filed on Dec. 27, 2018 and entitled "BASE STATION CAPABLE OF ALLOCATING CHANNEL-STATE REPORT AND METHOD FOR ALLOCATING CHANNEL-STATE REPORT".

BACKGROUND

1. Technical Field

The present disclosure relates to a base station capable of allocating channel-state report and a method for allocating channel-state report.

2. Related Art

In the current long-term evolution (LTE) network, the network side requires user devices to provide measurements and reports of wireless channels for the purpose of improving the usage efficiency of spectrum as well as providing a better service quality to users. The network side configures specific physical uplink control channel (PUCCH) resources to each of the device users via signaling from the radio resource control (RRC) layer when requiring the user devices to perform periodic channel-state information (CSI) report. However, the occupation of the overall bandwidth of the system by the PUCCH will be raised as the number of the user devices or the number of antennas is increased. As a result, the uplink bandwidth provided to the user devices are reduced, which means the bandwidth of the physical uplink shared channel is decreased.

In general, compared to the resource scheduling period of the media access control (MAC) layer, the configuration of the RRC layer is a semi-static configuration. The configuration will not be modified until the MAC implements for a period of time (e.g. several seconds to several minutes) after the configuration; otherwise, the signaling overhead between the network side and the user sides would be too large. Therefore, traditionally the configuration of periodic CSI report would not dynamically adjust the use of the PUCCH based on the queue length of the radio bearer and resource scheduling period of the MAC layer.

SUMMARY

According to one embodiment of the present disclosure, a base station capable of allocating channel-state report is disclosed. The base station includes a memory, a communication module and a processor communicatively connected to the memory and the communication module. The processor is configured to: send a plurality of radio resource control (RRC) messages to a plurality of user devices respectively, wherein each of the plurality of RRC messages comprises a periodic channel-state information (CSI) report parameter set and a discontinuous reception (DRX) parameter set, and the periodic CSI report parameter set comprises a report period, a report time shift and a piece of physical uplink control channel (PUCCH) resource information, wherein, for the plurality of RRC messages sent to the plurality of user devices respectively, the report periods are identical to one another, the report time shifts are identical to one another, and the pieces of PUCCH resource information are identical to one another; and perform a prediction process according to operational statuses of the plurality of user devices, and when predicting that a plurality of conflict user devices among the plurality of user devices will simultaneously report a channel-state information (CSI), determine one of the plurality of conflict user devices to report the CSI, and further drive the communication module to send a sleep instruction to each of the plurality of conflict user devices except the conflict user device determined to report the CSI.

According to one embodiment of the present disclosure, a method for allocating channel-state report is disclosed. The method includes steps of: by a base station, sending a plurality of radio resource control (RRC) messages to a plurality of user devices respectively, wherein each of the plurality of RRC messages comprises a periodic channel-state information (CSI) report parameter set and a discontinuous reception (DRX) parameter set, and the periodic CSI report parameter set comprises a report period, a report time shift and a piece of physical uplink control channel (PUCCH) resource information; and when the base station predicts that a plurality of conflict user devices among the plurality of user devices will simultaneously report a CSI, determining one of the plurality of conflict user devices to report the CSI, and further driving the communication module to send a sleep instruction to each of the plurality of conflict user devices except the conflict user device determined to report the CSI; wherein the plurality of RRC messages, sent to the plurality of user devices respectively, comprise the report periods identical to one another, the report time shifts identical to one another, and the pieces of PUCCH resource information identical to one another.

According to one embodiment of the present disclosure, a base station capable of allocating channel-state report is disclosed. The base station includes a memory, a communication module and a processor communicatively connected to the memory and the communication module. The processor is configured to: perform a scheduling algorithm to obtain a report period, a report time shift, a plurality of discontinuous reception (DRX) periods each corresponding to a respective one of a plurality of user devices, a plurality of wake-up time shifts each corresponding to a respective one of the plurality of user devices, and a plurality of wake-up durations each corresponding to a respective one of the plurality of user devices, so that a wake-up period of each of the plurality of user devices is not overlapped with a channel-report time; and drive the communication module to send a plurality of radio resource control (RRC) messages to the plurality of user devices respectively, wherein each of the plurality of RRC messages comprises the report period, the report time shift, a piece of physical uplink control channel (PUCCH) resource information, the DRX period corresponding to the user device receiving the RRC message, the wake-up time shift corresponding to the user device receiving the RRC message, and the wake-up duration corresponding to the user device receiving the RRC message, wherein, for the plurality of RRC messages sent to the plurality of user devices respectively, the report periods are identical to one another, the report time shifts are identical to one another, and the pieces of PUCCH resource information are identical to one another.

According to one embodiment of the present disclosure, a method for allocating channel-state report is disclosed. The method includes steps of: by a base station, performing a scheduling algorithm to obtain a report period, a report time shift, a plurality of discontinuous reception (DRX) periods each corresponding to a respective one of a plurality of user devices, a plurality of wake-up time shifts each corresponding to a respective one of the plurality of user devices, and a plurality of wake-up durations each corresponding to a respective one of the plurality of user devices, so that a wake-up period of each of the plurality of user devices is not overlapped with a channel-report time; and by the base station, driving the communication module to send a plurality of radio resource control (RRC) messages to the plurality of user devices respectively, wherein each of the plurality of RRC messages comprises the report period, the report time shift, a piece of physical uplink control channel (PUCCH) resource information, the DRX period corresponding to the user device receiving the RRC message, the wake-up time shift corresponding to the user device receiving the RRC message, and the wake-up duration corresponding to the user device receiving the RRC message, wherein, for the plurality of RRC messages sent to the plurality of user devices respectively, the report periods are identical to one another, the report time shifts are identical to one another, and the pieces of PUCCH resource information are identical to one another.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 2B is a diagram of operational waveforms of the user devices according to one embodiment of the present disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

In order to avoid the condition that physical uplink control channel (PUCCH) excessively occupies the overall system bandwidth due to the increased number of user devices, the concept disclosed in the present disclosure describes that a plurality of user devices in the same group shares the same resource index of physical uplink control channel (PUCCH) for reporting the channel-state information, so that the excessive occupation of the overall system bandwidth is reduced. Since a conflict may occur when a plurality of user devices shares the same channel resource, the method and the base station for allocating channel-state report of the present disclosure dynamically allocate the PUCCH resource to the user device which needs the PUCCH resource according to data transmission state of each of the user devices so as to avoid the occurrence of the conflict.

Figure 1A:
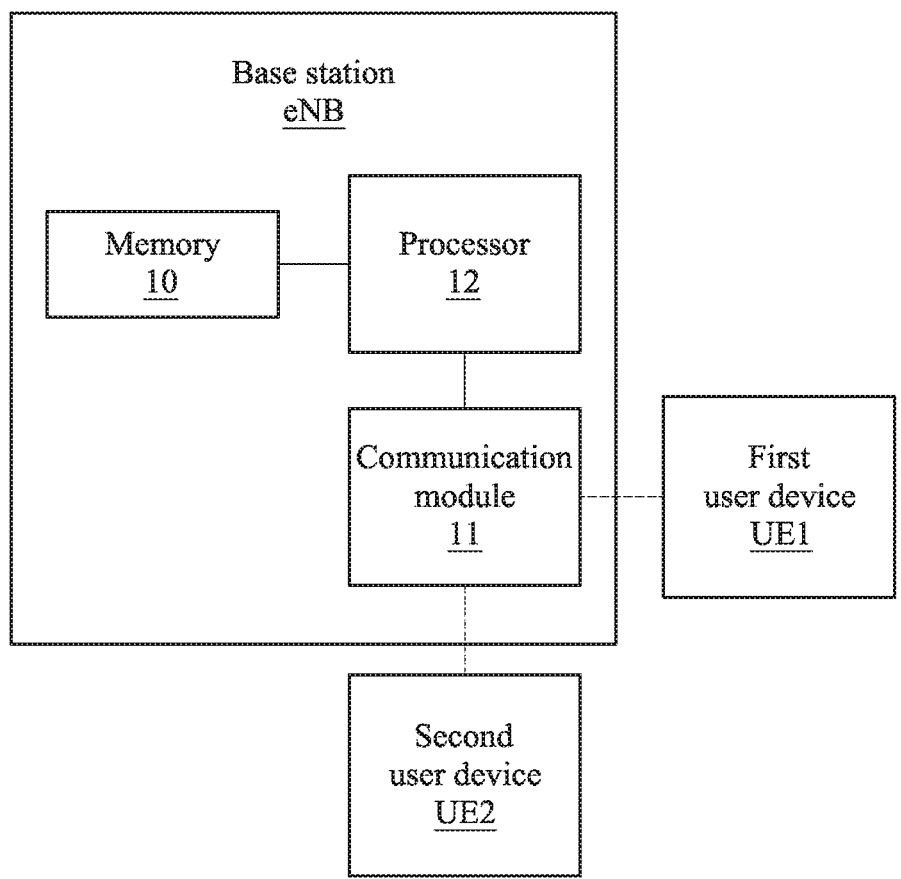
FIG. 1A is a schematic diagram of a long-term evolution network according to one embodiment of the present disclosure.
Figure 1B:
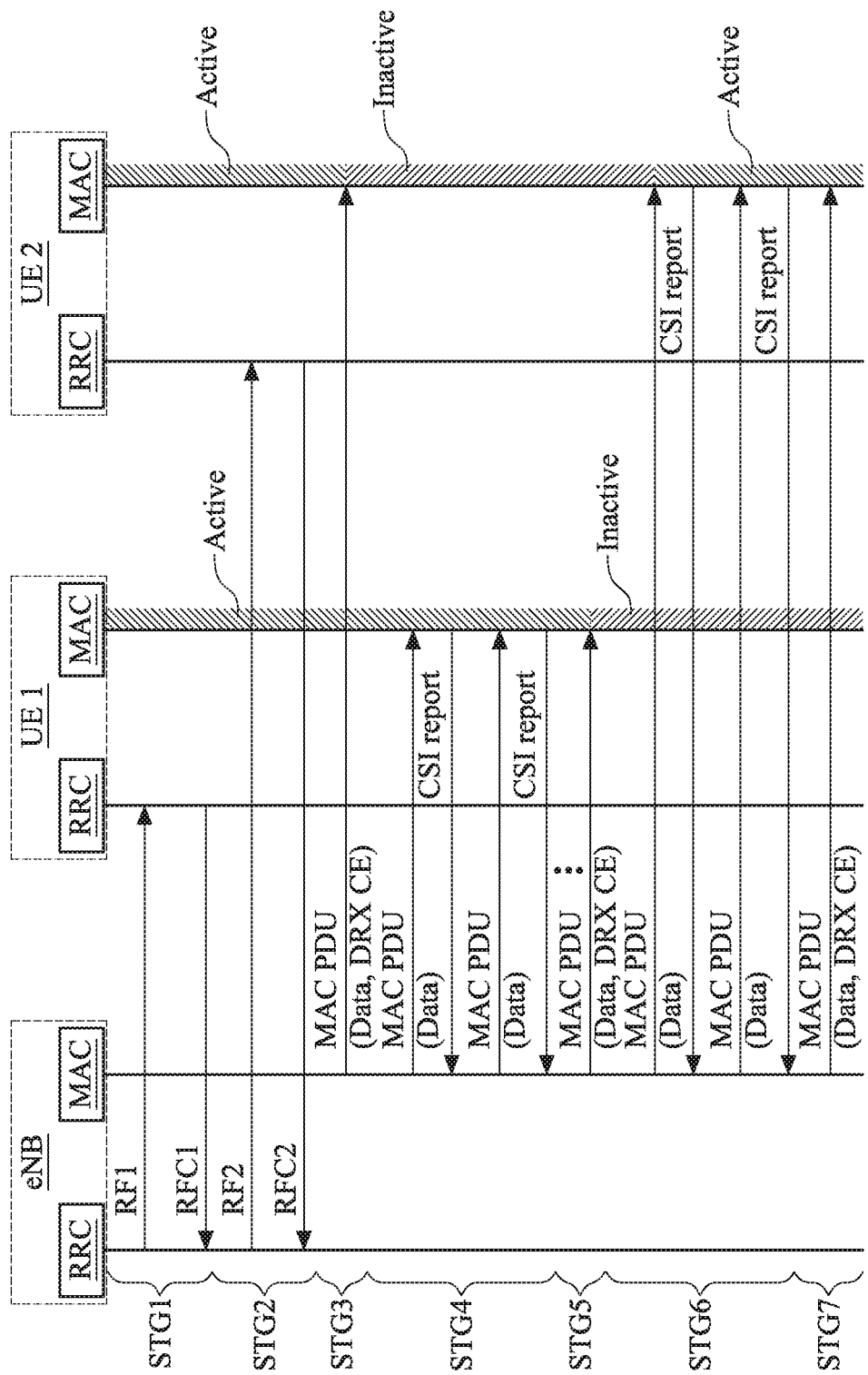
FIG. 1B is an operational diagram of user devices and a base station according to one embodiment of the present disclosure.
Figure 2A:
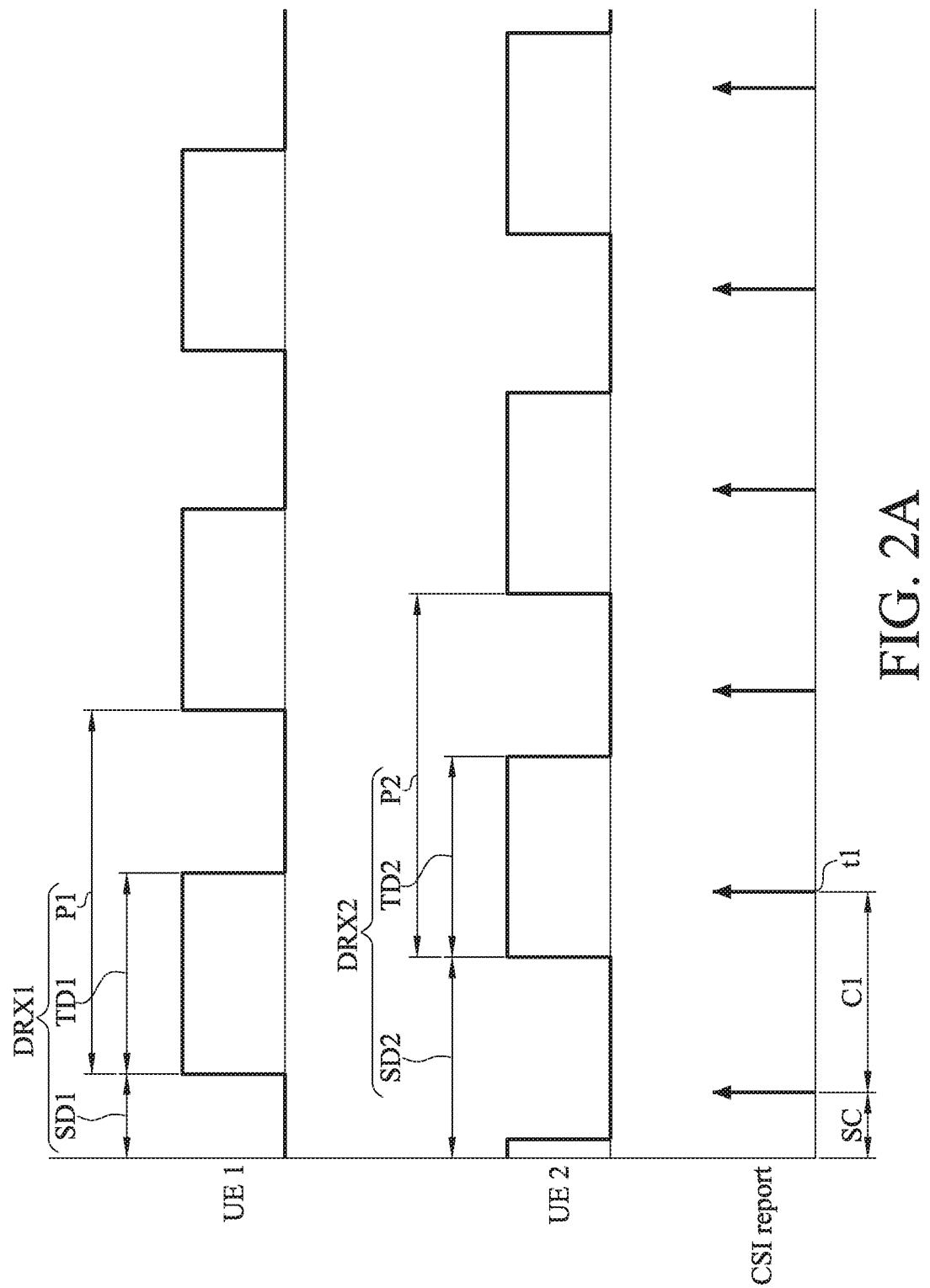
FIG. 2A is a diagram of preliminary waveforms set for the user devices according to one embodiment of the present disclosure.

First of all, please refer to FIG. 1A, FIG. 1B, FIG. 2A and FIG. 2B. FIG. 1A is a schematic diagram of a long-term evolution network according to one embodiment of the present disclosure. FIG. 1B is an operational diagram of user devices and a base station according to one embodiment of the present disclosure. FIG. 2A is a diagram of preliminary waveforms set for the user devices according to one embodiment of the present disclosure. FIG. 2B is a diagram of operational waveforms of the user devices according to one embodiment of the present disclosure. As shown in FIG. 1A and FIG. 1B, a long-term evolution network 1 includes a base station eNB as well as a first user device UE1 and a second user device UE2. The base station eNB is adapted to and communicatively connected to the first user device UE1 and the second user device UE2. The base station eNB has a memory 10, a communication module 11 and a processor 12. The processor 12 is configured to control a radio resource control (RRC) layer as well as a media access control (MAC) of the base station eNB, wherein the base station eNB further has a scheduler (not shown in figures) disposed in the MAC layer. The processor 12 of the base station eNB generates one or more RRC configuration messages. In one embodiment, the one or more RRC configuration messages are stored in the memory 10, and the processor 12 drives the communication module 11 to send out the one or more RRC configuration message to the user device UE1 and the user device UE2. Each configuration message includes a periodic channel-state information report parameter set and a discontinuous reception parameter set. The periodic channel-state information report parameter set includes a report period, a report time shift and a piece of PUCCH resource information, and the discontinuous reception parameter set includes a discontinuous reception period, a wake-up time shift and a wake-up duration.

Specifically, in stages STG1-STG2 shown in FIG. 1B, the processor 12 of the base station eNB sends signaling RF1, RF2 and receives signaling RFC1, RFC2 via the RRC layer to complete the configurations of discontinuous reception parameter sets DRX1 and DRX2 as well as periodic channel-state information (CSI) report parameter sets for the first user device UE1 and the second user device UE2. In more detail, as shown in FIG. 2A, the discontinuous reception parameter set DRX1 includes a discontinuous reception period P1, a wake-up time shift SD1 and a wake-up duration TD1 while the discontinuous reception parameter set DRX2 includes a discontinuous reception period P2, a wake-up time shift SD2 and a wake-up duration TD2. The wake-up duration and the sleep duration are continuously presented in a periodical manner to form a power-saving mechanism of discontinuous reception. In this embodiment, the first user device UE1 and the second user device UE2 share the same report period (e.g. C1), the report time shift (e.g. SC) and the PUCCH resource.

The processor 12 of the base station eNB is connected to the scheduler included in the radio resource control layer RRC to trace an operational state of each of the first user device UE1 and the second user device UE2. In more detail, the processor 12 drives the scheduler to trace an active state and an inactive state of each of the first user device UE1 and the second user device UE2. In practice, the active state corresponding to the aforementioned wake-up duration represents a state in which the first user device UE1 and the second user device UE2 are capable of receiving data. In contrast, the inactive state corresponding to the aforementioned sleep duration represents a state in which the first user device UE1 and the second user device UE2 is incapable of receiving data. The distribution of the active state and the inactive state included in the operational state of the first user device UE1 is determined by the discontinuous reception period P1, the wake-up time shift SD1 and the wake-up duration TD1. The distribution of the active state and the inactive state included in the operational state of the user device UE2 is determined by the discontinuous reception period P2, the wake-up time shift SD2 and the wake-up duration TD2.

In this embodiment, the processor 12 performs a prediction process according to the operational states of the first and the second user devices UE1, UE2. When predicting that the first and the second user device UE1, UE2 will simultaneously report a channel-state information, the processor 12 would determine one of the first and the second user device UE1, UE2 to report the channel-state information report. Then, the processor 12 drives the communication module 11 to send a sleep instruction to the other one of the first and the second user device UE1, UE2. In other words, the first and the second user device UE1, UE2 are considered as conflict user devices. The processor 12 determines one (e.g. the first user device UE1) of the two conflict user device to use the PUCCH resource to report the channel-state information. On the other hand, the processor 12 uses the sleep instruction to drive the other user device (e.g. the second user device UE2) to go to the sleep state.

More specifically, the processor 12 predicts whether or not a conflict of channel-state information (CSI) report will occur at a CSI report time point t1 according to the operational states of the first user device UE1 and the second user device UE2 by using the scheduler. The CSI report time point t1 is determined by the report period C1 and the report time shift SC. In more detail, practically, the user device which is in the active state would use the PUCCH resource to report the channel-state information. However, as described above, since the first and the second user device UE1, UE2 shares the same physical uplink control channel resource by using the same physical uplink control channel index number (e.g. Index 0), only one of the two user devices is allowed to use the physical uplink control channel resource to report the channel-state information at a single time point. In the embodiment of FIG. 2B, it is assumed that a channel-state information report will be performed at a time point (e.g. the CSI report time point t1). If both of the first and the second user devices are in the active states at the time point, it means that the first and the second user devices UE1, UE2 will use the same PUCCH resource to report the CSI simultaneously. In this case, accordingly, the processor 12 predicts that a conflict of CSI report will occur. Particularly, it is noted that, in FIG. 2B, in the period of time between the two dotted lines, the first user device UE1 and the second user device UE2 would both be in active states if the sleep instruction DRX_CE is not applied.

As described above, when it is predicted that the conflict of CSI report will occur, the processor 12 of the base station eNB detects data transmission states of the first user device UE1 and the second user device UE2, so as to determine to send a sleep instruction DRX_CE to terminate the wake-up duration of one of the first user device UE1 and the second user device UE2. In one embodiment, the sleep instruction DRX_CE is a DRX Command of MAC CONTROL ELEMENT (DRX CE).

In one embodiment, when the processor 12 of the base station eNB determines one of the first user device UE1 and the second user device UE2 to perform data transmission, the processor 12 drives the communication module 11 to send the sleep instruction DRX_CE to make the other one of the first user device UE1 and the second user device UE2 to enter the inactive state of the operational state and not to report the CSI by using the PUCCH resource. Specifically, when both of the first user device UE1 and the second user device UE2 are in the active state at the CSI report time point t1, the processor 12 of the base station eNB would detect and determine which one of the first user device UE1 and the second user device UE2 to perform the data transmission, and further send the sleep instruction DRX_CE to the user device which is determined not to perform the data transmission by driving the communication module 11 so as to terminate the wake-up duration of the user device which is determined not to perform the data transmission. Accordingly, the user device which is determined not to perform the data transmission will not report the CSI. In one embodiment, the sleep instruction DRX_CE is a DRX Command of MAC CONTROL ELEMENT (DRX CE).

In the embodiment of FIG. 2B, when it is determined that the conflict of CSI report will occur at the CSI report time point t1, the processor 12 would send the sleep instruction DRX_CE to the second user device UE2 to terminate the wake-up duration TD2 if the processor 12 of the base station eNB determines the first user device UE1 to perform the data transmission, as shown in stage STG3 of FIG. 1B and FIG. 2B. In other words, the second user device UE2 is forced to enter the sleep duration from the current wake-up duration TD2 according to the sleep instruction DRX_CE and would not report the CSI. More specifically, the second user device UE2 goes to the inactive state OFF from the active state ON. In this case, the physical uplink control channel resource can be provided to the first user device UE1 to report the CSI at the report time point (e.g. t1), as shown in stage STG4 of FIG. 1B. In one embodiment, the sleep instruction DRX_CE is a DRX Command of MAC CONTROL ELEMENT (DRX CE). Thereby, the conflict between the first user device UE1 and the second user device UE2 on the CSI report can be avoided.

Figure 3:
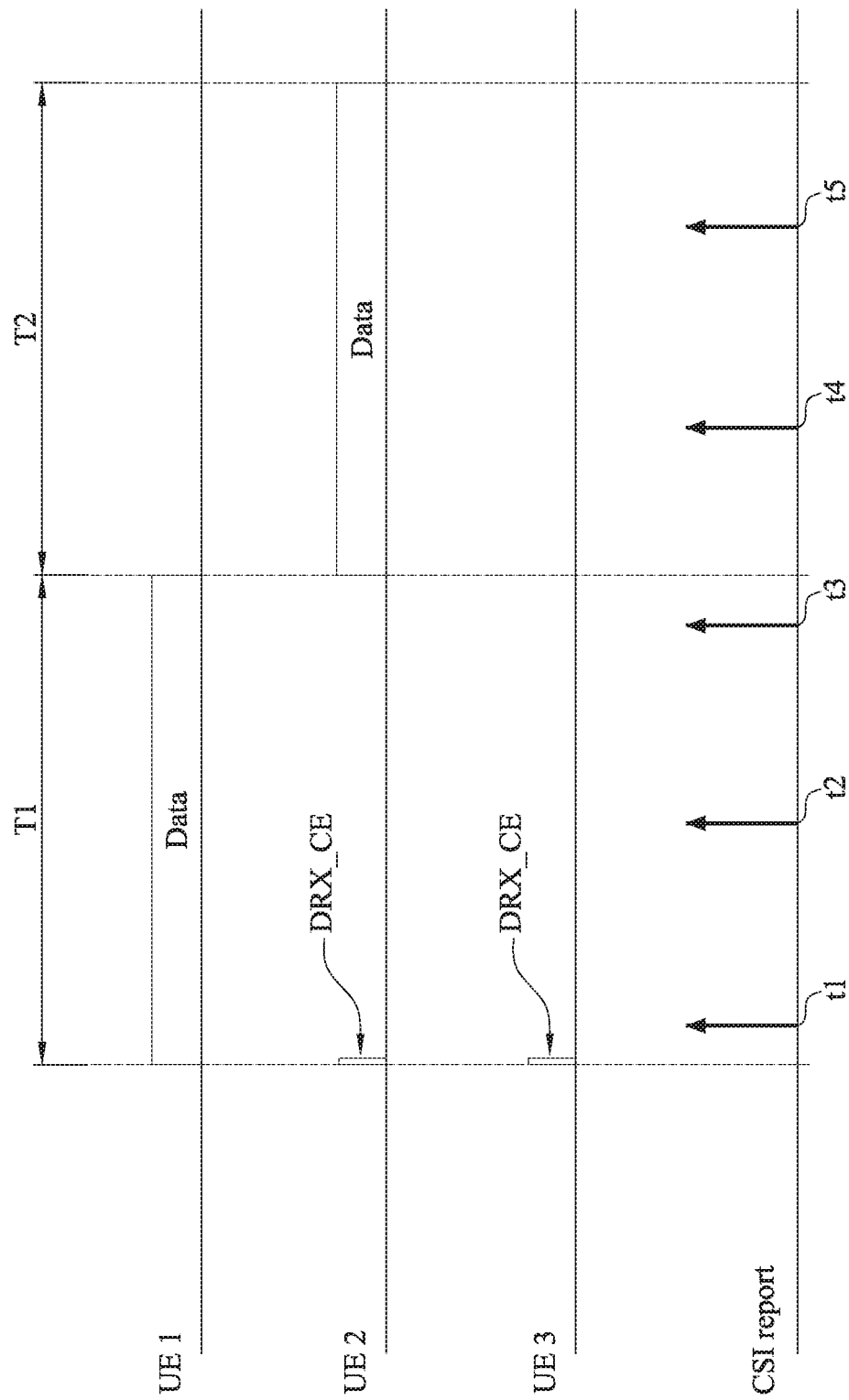
FIG. 3 is a diagram of operational waveforms of user devices according to one embodiment of the present disclosure.

Please further refer to FIG. 3, which is a diagram of operational waveforms of user devices according to one embodiment of the present disclosure. FIG. 3 illustrates data transmission states of the first user device UE1, the second user device UE2 and a third user device UE3. According to FIG. 3, when the processor 12 of the base station eNB determines the first user device UE1 to perform the data transmission in a first period T1, the second user device UE2 and the third user device UE3 both enter the sleep state based on the sleep instruction DRX_CE sent by the processor 12. For example, the sleep state corresponds to the inactive state OFF in FIG. 2B. In this case, the physical uplink control channel resource can be provided to the first user device UE1 for reporting the CSI at report time points t1-t3.

When the processor 12 of the base station eNB determines the second user device UE2 to perform the data transmission in the second period T2, the first user device UE1 and the third user device UE3 both enter the sleep state based on the sleep instruction DRX_CE. For example, the sleep state corresponds to the inactive state OFF in FIG. 2B. In this case, the physical uplink control channel resource can be provided to the second user device UE2 for reporting the CSI at report time points t4-t5. In one embodiment, the sleep instruction DRX_CE is a DRX Command of MAC CONTROL ELEMENT (DRX CE).

In other words, the first user device UE1, the second user device UE2 and the third user device UE3 all share the same physical uplink control channel resource (i.e. in time, frequency and coding domain). In more detail, the three user devices use the same resource index of physical uplink control channel. In a real implementation, a single PUCCH resource cannot be provided to a plurality of user devices at the same time. Accordingly, the base station eNB disclosed in the present disclosure determines some user devices to enter the sleep state based on the data transmission states of the user devices, so the physical uplink control channel resources can be provided to the user device which is determined to have data to be transmitted. Therefore, the condition that the PUCCH resources excessively occupy the overall bandwidth of the system can be avoided.

In one embodiment, when the processor 12 of the base station eNB determines the second user device UE2 to perform the data transmission and accordingly the second user device UE2 enters the active state from the inactive state and uses the PUCCH resource corresponding to the PUCCH resource index to report CSI. More specifically, as shown in the embodiment of FIG. 1B, in stage STG5, after the first user device UE1 completes the data transmission, the processor 12 of the base station eNB uses the sleep instruction DRX_CE to drive the first user device UE1 to enter the inactive state. When the second user device UE2 is determined to perform the data transmission, the processor 12 of the base station eNB keeps waiting until the second user device UE2 enters the active state and sending data to the second user device UE2. At this moment, the second user device UE2 uses the physical uplink control channel resource (Index 0) to report the CSI, as shown in stage STG6 of FIG. 1B. Since the first user device UE1 has been in the inactive state, the conflict of CSI report would not occur as the second user device UE2 uses this PUCCH resource index to report the CSI. Then, as shown in stage STG7 of FIG. 1B, after the second user device UE2 completes the data transmission, the processor 12 of the base station eNB uses the sleep instruction DRX CE to drive the second user device UE2 to enter the inactive state. In one embodiment, the sleep instruction DRX_CE is a DRX Command of MAC CONTROL ELEMENT (DRX CE).

Figure 4A:
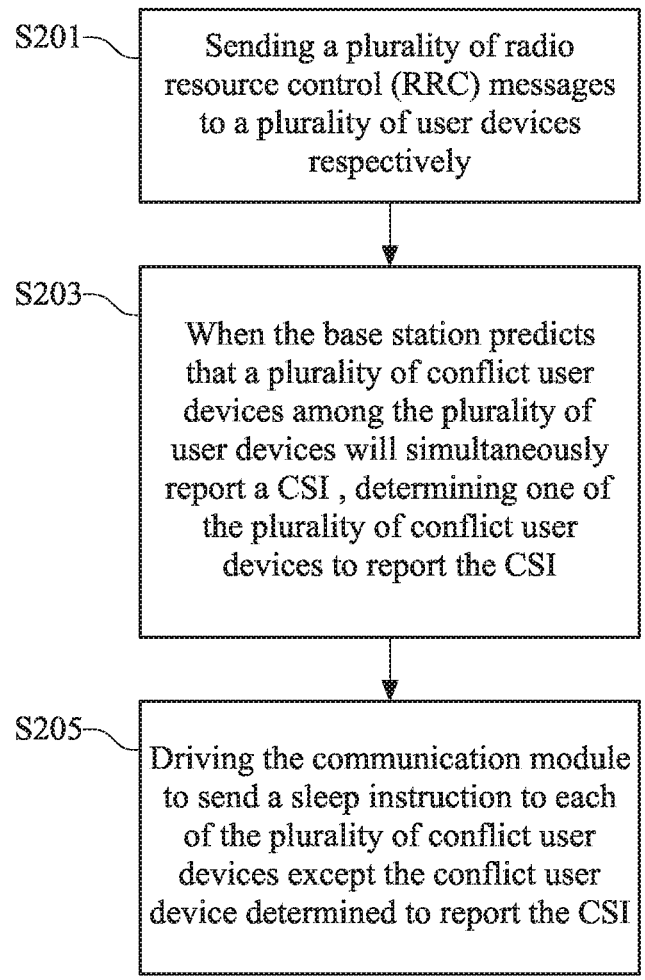
FIG. 4A is a flow chart of a method for allocating channel-state report according to one embodiment of the present disclosure.

Please refer to FIG. 4A, which is a flow chart of a method for allocating channel-state report according to one embodiment of the present disclosure. The method for allocating channel-state report is adapted to a plurality of user devices such as the first user device UE1 and second user device UE2. As shown in FIG. 4A, in step S201, the processor 12 of the base station eNB sends a plurality of RRC configuration messages to the plurality of user devices respectively by controlling a RRC layer. Each of the RRC configuration messages includes a periodic channel-state information report parameter set and a discontinuous reception parameter set. The periodic channel-state information report parameter set includes a report period, a report time shift and a piece of PUCCH resource information. The discontinuous reception parameter set includes a discontinuous reception period, a wake-up time shift and a wake-up duration.

In the embodiment, the operational state is determined by the discontinuous reception period, the wake-up time shift and the wake-up duration. The CSI report time is determined by the report period and the report time shift. In this embodiment, based on the RRC configuration messages, the report period, the report time shift and the PUCCH resource index of the user devices are identical to each other.

In step S203, when the processor 12 of the base station eNB predicts that a plurality of conflict user devices among the plurality of user devices will simultaneously reports a CSI according to the operational states of the plurality of user devices, the base station eNB determines one of the plurality of conflict user devices to report the CSI. In step S205, the base station eNB sends a sleep instruction to the plurality of user devices except the conflict user device which is determined to report the CSI.

Figure 4B:
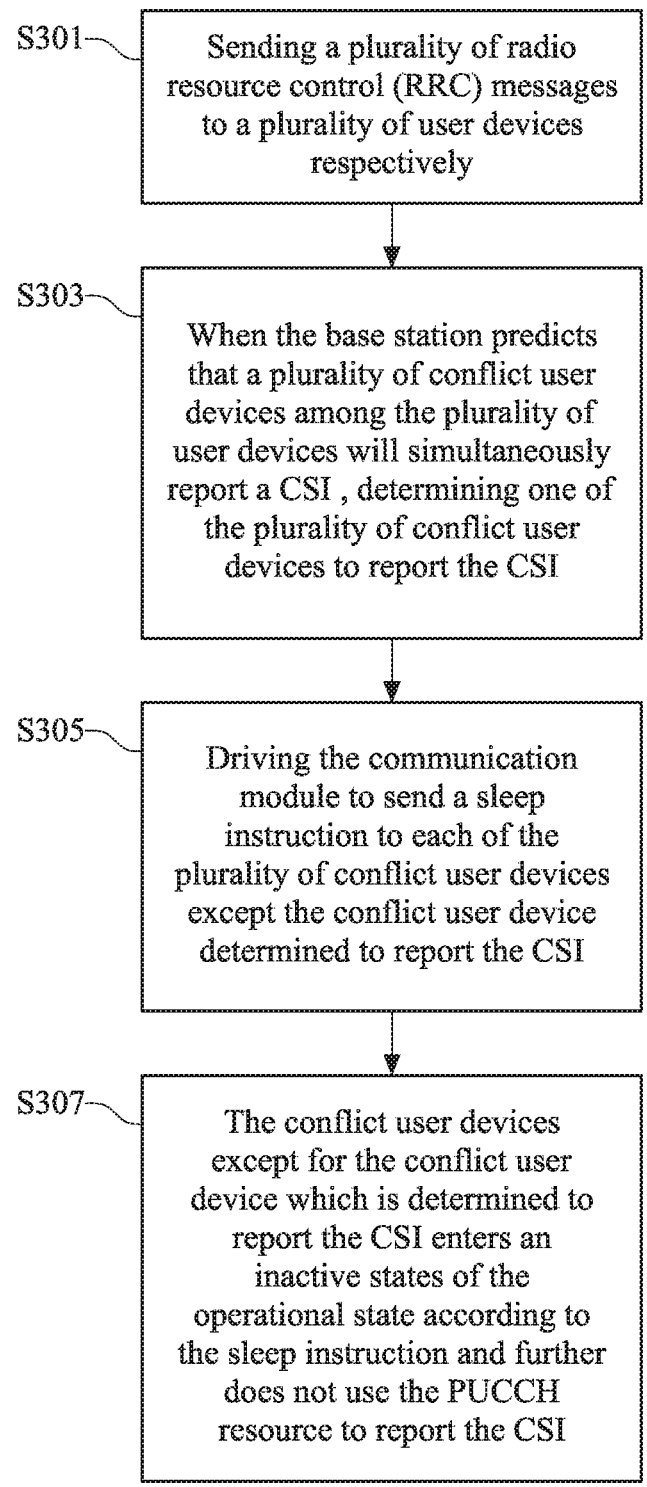
FIG. 4B is a flow chart of a method for allocating channel-state report according another embodiment of the present disclosure.

Please refer to FIG. 4B, which is a flow chart of a method for allocating channel-state report according another embodiment of the present disclosure. Steps of 4B are basically the same as steps of FIG. 4A, but the difference lies in that FIG. 4B further includes S307. In step S307, the conflict user devices except for the conflict user device which is determined to report the CSI enters an inactive states of the operational state according to the sleep instruction and further does not use the PUCCH resource to report the CSI.

For example, if the base station eNB predicts that the first user device UE1 and the second user device UE2 will simultaneously report the CSI at a CSI report time point according to the operational states, the base station eNB determines the first user device UE1 to use the PUCCH resource to report the CSI according to the data transmission states of the first and the second user device UE1, UE2. On the other hand, the base station eNB sends a sleep instruction to the second user device UE2 to terminate the wake-up duration of the second user device UE2, so that the second user device UE2 enters an inactive state. Therefore, the conflict of the CSI report performed by using the same PUCCH resource between the first user device UE1 and the second user device UE2 can be avoided.

The aforementioned embodiments mainly describe using the sleep instruction sent by the base station eNB to force the user devices determined not to perform data transmission to enter the sleep states, so that the PUCCH resources can be dynamically allocated to the user devices for performing the periodic CSI report. Therefore, the efficiency of the PUCCH resources is raised and the overall demands for the PUCCH resources are reduced. In another embodiment, the above purpose can be achieved by configuring a specific length relationship between the discontinuous reception period and the channel-state information report period, the above purpose can be achieved.

Figure 5A:
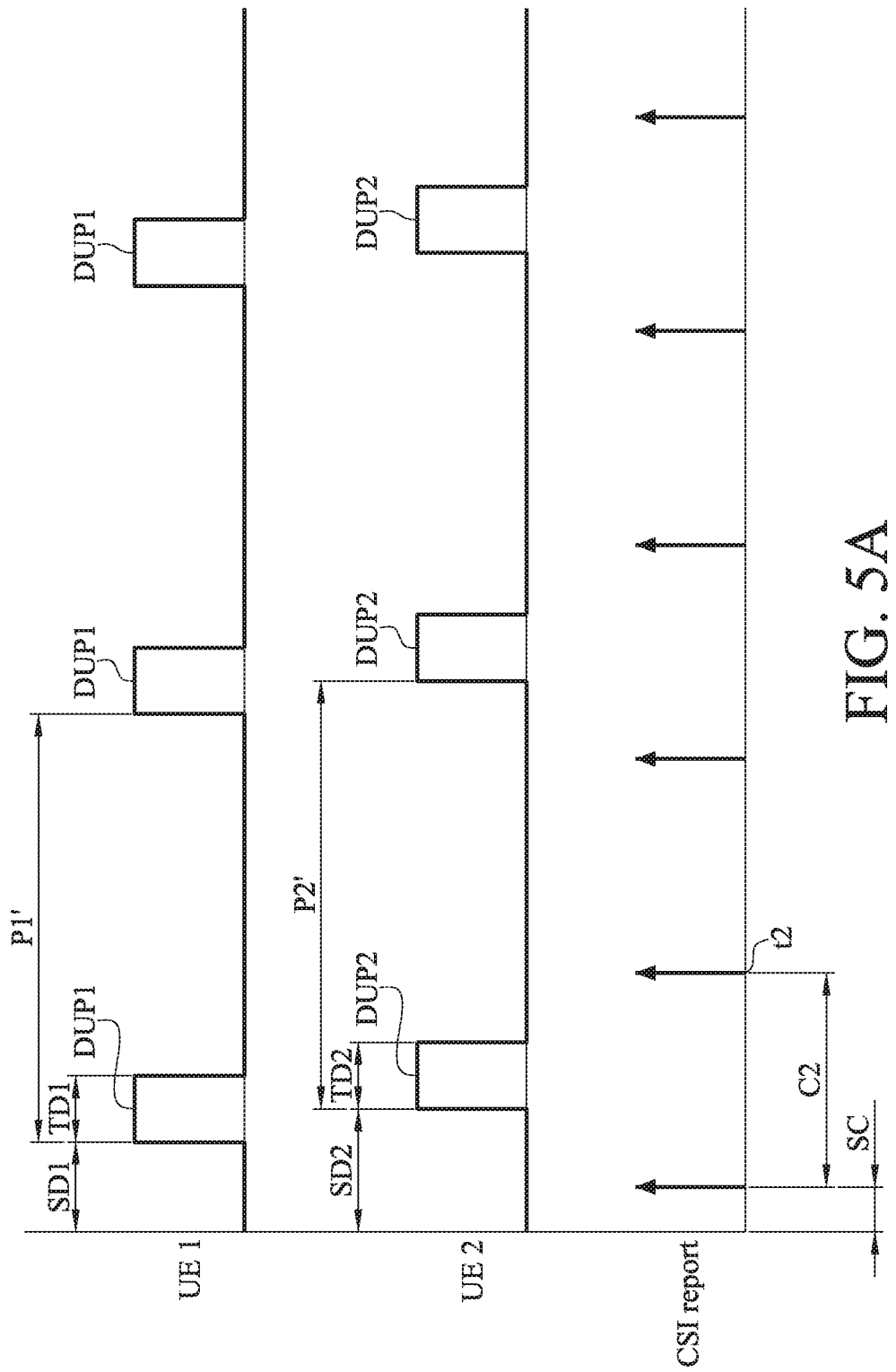
FIG. 5A is a diagram of preliminary waveforms set for the user devices according to another embodiment of the present disclosure.
Figure 5B:
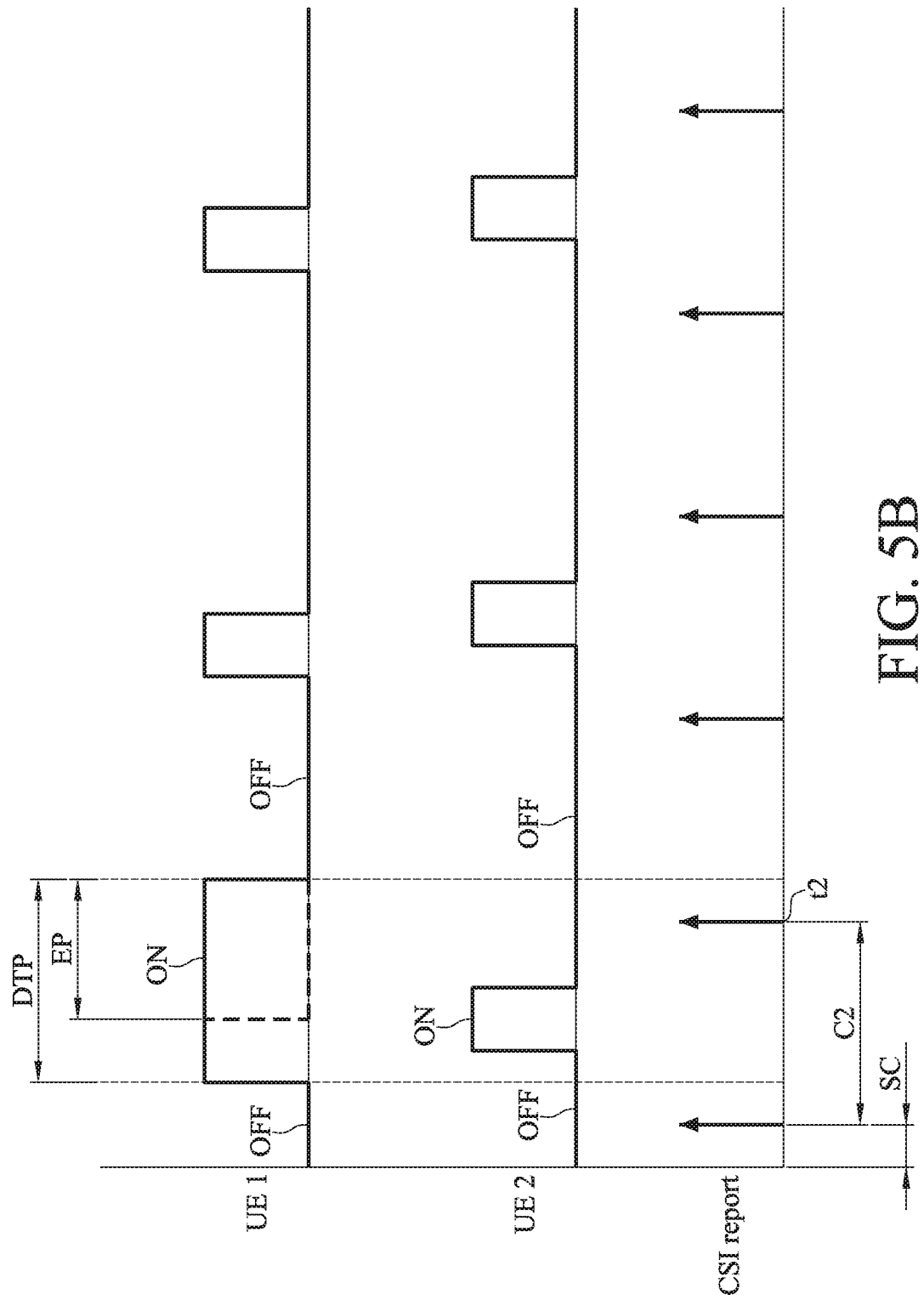
FIG. 5B is a diagram of operational waveforms of the user devices according to another embodiment of the present disclosure.

Specifically, please refer to FIG. 1, FIG. 5A and FIG. 5B. FIG. 5A is a diagram of preliminary waveforms set for the user devices according to another embodiment of the present disclosure. FIG. 5B is a diagram of operational waveforms of the user devices according to one embodiment of the present disclosure. In this embodiment, as shown in FIG. 1, the base station eNB has the memory 10, the communication module 11 and a processor 12 communicatively connected to the memory 10 and the communication module 11. The processor 12 performs a scheduling algorithm to obtain a report period, a report time shift and a plurality of discontinuous reception periods each corresponding to a respective one of the plurality of user devices, a plurality of wake-up time shifts each corresponding to a respective one of the plurality of user devices and a plurality of wake-up durations each corresponding to a respective one of the plurality of user devices, so that a wake-up period of each of the plurality of user devices is not overlapped with a channel-report time. In further, the processor 12 drives the communication module 11 to send a plurality of RRC configuration messages to the plurality of user devices respectively. Each of the RRC configuration messages includes the aforementioned report period and report time shift as well as a piece of PUCCH resource information. The RRC configuration messages further includes the discontinuous reception period corresponding to the user device receiving the RRC configuration message, the wake-up time shift corresponding to the user device receiving the RRC configuration message and the wake-up duration corresponding to the user device receiving the RRC configuration message. In this embodiment, for the RRC configuration messages sent to the plurality of user devices respectively, the report periods are identical to one another, the report time shifts are identical to one another, and the pieces of PUCCH resource information are identical to one another For example, as shown in FIG. 5A, by performing a scheduling algorithm, the processor 12 obtains a report period C2, a report time shift SC, discontinuous reception periods P1', P2', wake-up time shifts SD1, SD2 and wake-up durations TD1, TD2 corresponding to the first user device UE1 and the second user device UE2. The processor 12 sends RRC configuration messages to the first user device UE1 and the second user device UE2 respectively via the communication module 11. The RRC configuration messages include the report period C2, the report time shift SC and a piece of PUCCH resource information. The RRC configuration messages further include the discontinuous reception periods P1', P2', the wake-up time shifts SD1, SD2 and the wake-up time durations TD1, TD2 corresponding to the first user device UE1 and the second user device UE2. In this embodiment, each of the discontinuous reception periods P1', P2' is twice as long as the report period C2. However, the relationship mentioned in the above embodiment is merely for illustration, and the present disclosure is not limited to the above embodiment. In this embodiment, the first and the second user devices UE1, UE2 have the same configuration of the report period C2, the report time shift SC and the PUCCH resource.

The processor 12 of the base station eNB is configured to determine one of the first user device and the second user device to perform a data transmission in a duration of data transmission DTP. When a report time point is located within the duration of data transmission DTP of the user device determined to perform the data transmission, the user device determined to perform the data transmission performs the CSI report. However, the user devices except for the user device determined to perform the data transmission do not perform the CSI report. The duration of data transmission DTP is associated with the wake-up duration. The wake-up durations TD1 and TD2 are configured to determine the wake-up periods DUP1 and DUP2 of the first and the second user devices UE1 and UE2. The wake-up periods DUP1 and DUP2 are not overlapped with the report time point (e.g. t2).

As shown in FIG. 5B, if the processor 12 of the base station eNB determines the first user device UE1 to perform the data transmission in the duration of data transmission DTP and the report time point t2 is located in the duration of data transmission, the first user device UE1 would use the PUCCH resource to perform the CSI report by using the PUCCH resource. In this case, the second user device UE2 does not perform the CSI report. The report time point t2 is determined by the report period C2 and the report time shift SC, and the duration of data transmission DTP is associated with the discontinuous reception period P1', the wake-up time shift SD1 and the wake-up duration TD1. In an implementation, as shown in FIG. 5A and FIG. 5B, the processor 12 is configured to extend the wake-up time duration TD1 for a period EP to generate the duration of data transmission. In other words, when the first user device UE1 performs the data transmission in the wake-up duration TD1, the processor 12 may extend the wake-up duration TD1 for the period EP due to the insufficient wake-up duration TD1, so that the first user device UE1 is allowed to complete the process of the data transmission.

In the present disclosure, the base station configures the discontinuous reception period and the report period properly, so that the wake-up period and the report time are not overlapped with each other. Thereby, the user device determined to perform the data transmission is allowed to use the PUCCH resource to report the CSI, and the user devices determined not to perform the data transmission does not report the CSI.

Figure 6:
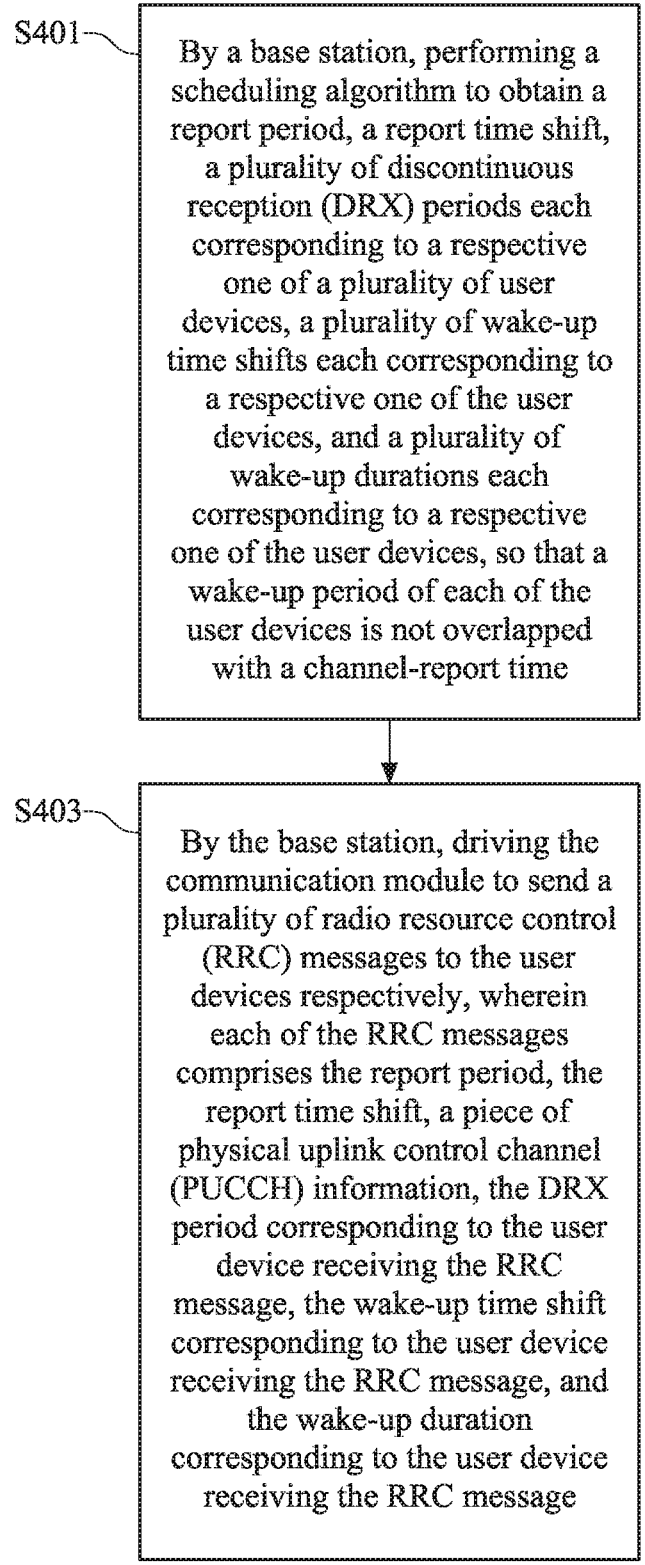
FIG. 6 is a flow chart of a method for allocating channel-state report according to another embodiment of the present disclosure.

Please refer to FIG. 6, which is a flow chart of a method for allocating channel-state report according to another embodiment of the present disclosure. As shown in FIG. 6, in step S401, the base station performs a scheduling algorithm to obtain a report period, a report time shift, a plurality of discontinuous reception periods each corresponding to a respective one of a plurality of user device, a plurality of wake-up time shifts each corresponding to a respective one the plurality of user device and a plurality of wake-up duration each corresponding to a respective one of the plurality of user devices, so that a wake-up period of each of the plurality of user devices is not overlapped with a report time.

In step S403, the base station sends a plurality of RRC configuration messages to the plurality of user devices respectively. Each of the plurality of configuration messages includes the report period, the report time shift, a piece of PUCCH resource information, the discontinuous reception period corresponding to the user device receiving the RRC message, the wake-up time shift corresponding to the user device receiving the RRC message, and the wake-up duration corresponding to the user device receiving the RRC message. For the plurality of RRC messages sent to the plurality of user devices respectively, the report periods are identical to one another, the report time shifts are identical to one another, and the pieces of PUCCH resource information are identical to one another. In one embodiment, one the report period C2 and the discontinuous reception period is N times of the other one of the report period C2 and the discontinuous reception period, wherein N is an integer, but the present disclosure is not limited to the above embodiment. The detailed descriptions about steps of FIG. 6 have been illustrated in the aforementioned paragraphs, so not repeated.

In one embodiment, the wake-up time shift includes a first shift time SD, and the report time shift includes a second shift time SC, wherein a relational equation (1) or a relational equation (2) is established as follows:

$$\frac{PD1 + SD + TD - SC}{PC} \leq n < \frac{PD2 + SD - SC}{PC} \text{ relational equation (1) or}$$

$$n < \frac{SD - SC + PD1}{PC} \text{ relational equation (2)}$$

Wherein PD1 stands for an initial point of first discontinuous reception period, PD2 stands for an initial point of second discontinuous reception period adjacent to the initial point of first discontinuous reception period, PC stands for the report period, SD stands for the first shift time, SC stands for the second shift time, TD stands for the wake-up duration, wherein n is a non-negative integer. When the relational equations are held with those parameters inputted thereto, it is ensured that an occurrence of the CSI report will be not within the wake-up period but within the sleep period.

More specifically, the relational equation (1) can be converted to another relational equation (3): PD1+SD+TD<nPC+SC<PD2+SD, or the relational equation (2) can be converted to another relational equation (4): nPC+SC<SD. According to the above converted relational equation (3) and (4), the occurrence of the CSI report is located in a range between PD1+SD+TD and PD2+SD, or in a range less than SD. Thereby, the it is ensured that an occurrence of the CSI report will be within the sleep period and not be within the wake-up period. The above concept will be illustrated by one or more embodiments in the following paragraphs.

Figure 7:
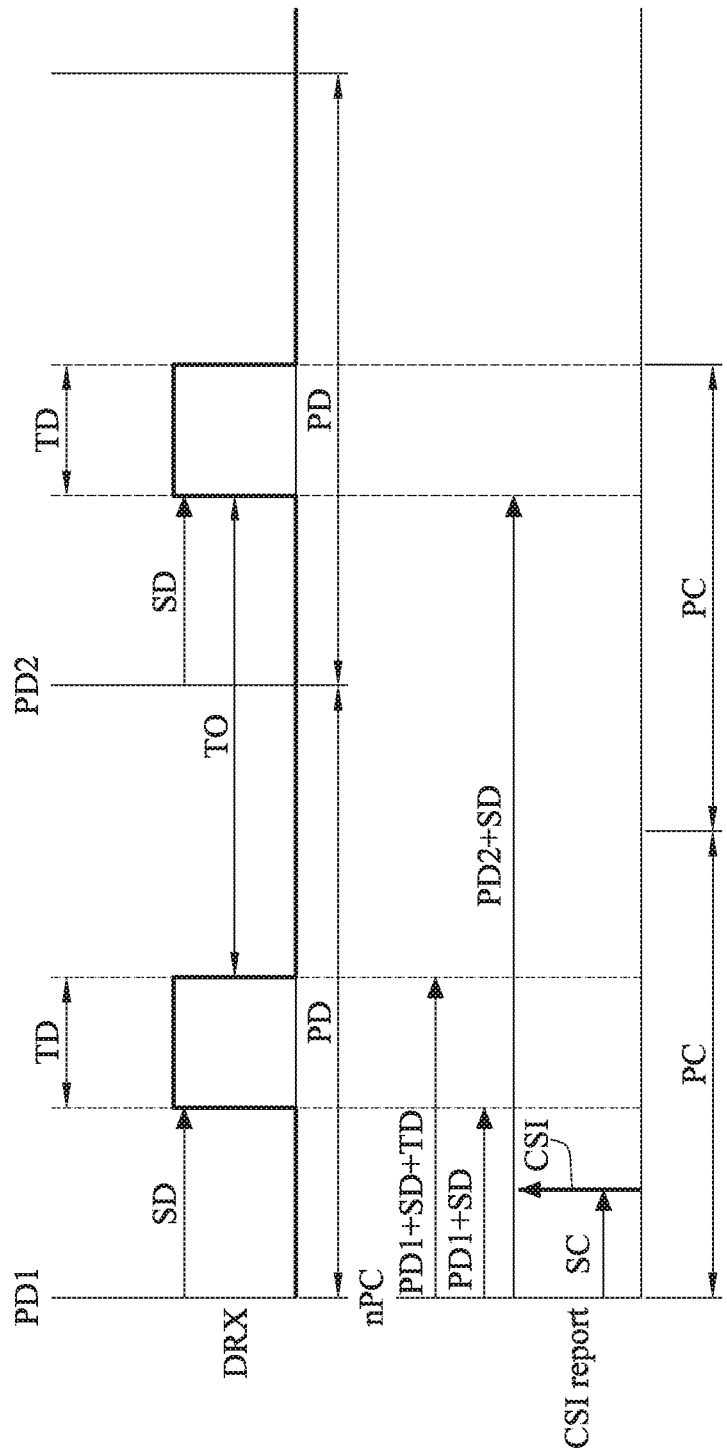
FIG. 7 is a diagram of operational waveforms according to one embodiment of the present disclosure.

Please refer to FIG. 7, which is a diagram of operational waveforms according to one embodiment of the present disclosure. Specifically, FIG. 7 illustrates waveforms corresponding to a discontinuous reception parameter set DRX and a CSI report parameter set. The discontinuous reception parameter set DRX includes two wake-up durations TD and a sleep period TO between them. More specifically, for the purpose that the occurrence of the CSI report is located within the sleep period TO, it is configured such that nPC+SC is greater than PD1+SD+TD and less than PD2+SD, wherein the nPC stands for $n^{th}$ CSI report in respective to an initial point. The method of the present disclosure configures those parameters as satisfying the relational equation (1) or the relational equation (2). Accordingly, the occurrence of the CSI report is not located in the wake-up period but located in the sleep period TO.

In one embodiment, the method of the present disclosure further includes: determining the wake-up duration according to a data transmission load when the discontinuous reception period is identical to the report period; configuring the first shift time SD as satisfying 0≤SD<PD; configuring the second shift time SC as satisfying 0≤SC<SD or SD+TD≤SC<PC when a sum of the first shift time SD and the wake-up duration TD is less than the report period PC; configuring the second shift time SC as satisfying mod(SD+TD, PC)≤SC<SD when the sum of the first shift time SD and the wake-up duration TD is greater than or equal to the report period PC. An embodiment in which the discontinuous reception period is identical to the report period is given for illustration.

Figure 8A:
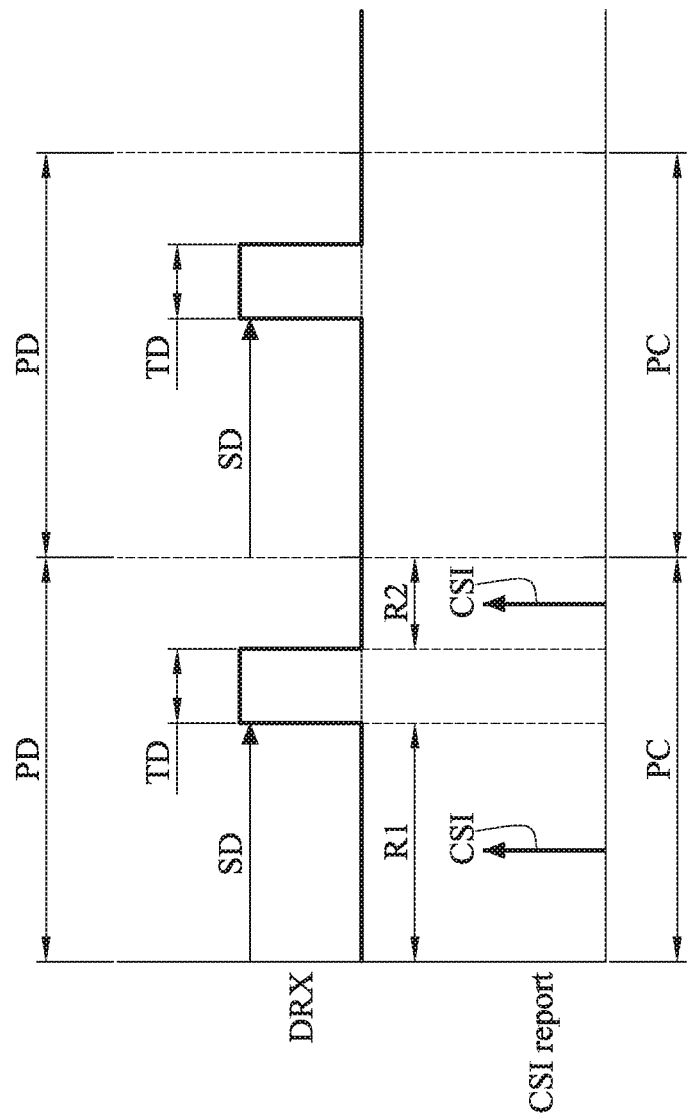
FIG. 8A to FIG. 8B are diagrams of operational waveforms according to different embodiments of the present disclosure.
Figure 8B:
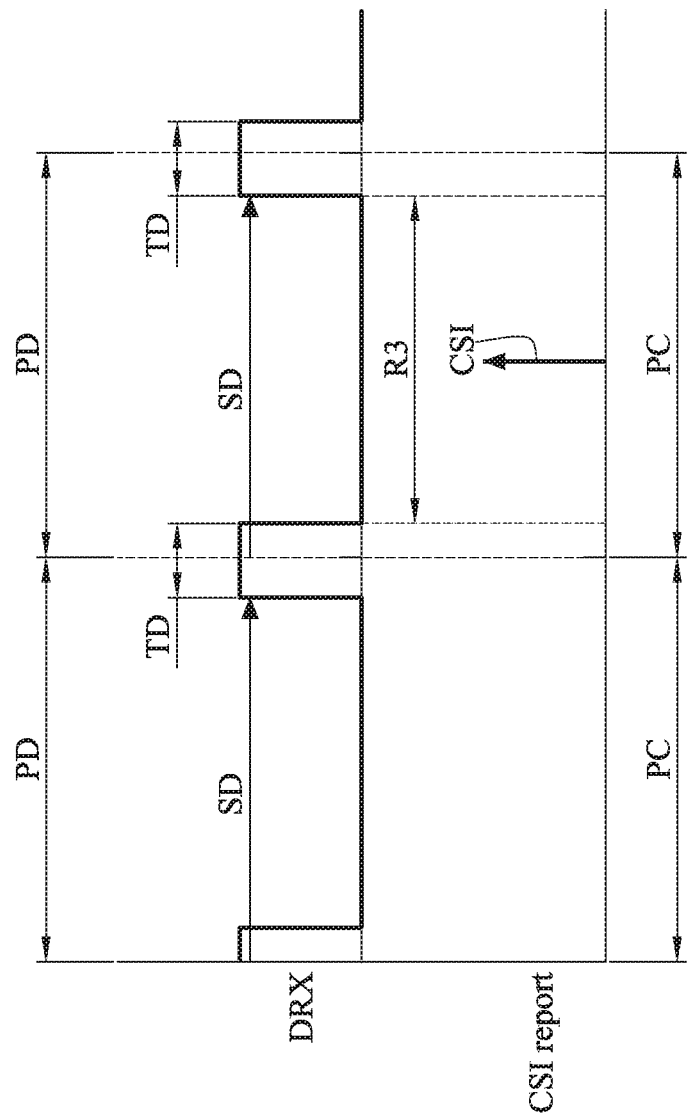

Please refer FIG. 8A to FIG. 8B, which are diagrams of operational waveforms according to different embodiments of the present disclosure. FIG. 8A illustrates an embodiment in which the sum of the first shift time SD and the wake-up duration TD is less than the report period PC. As shown in FIG. 8A, the allowable time for CSI report, corresponding to the second shift time SC, may be located within a range R1 of 0≤SC<SD, or located within a range R2 of SD+TD≤SC<PC. Accordingly, the occurrence of the CSI report is not located within the wake-up period but within the sleep period. FIG. 8B illustrates the embodiment in which the sum of the first shift time SD and the wake-up duration TD is greater than or equal to the report period PC. As shown in FIG. 8B, the allowable time for the CSI report corresponding to the second shift time SC is located within a range R3 of mod(SD+TD, PC)≤SC<SD, the occurrence of the CSI report is not located within the wake-up period but within the sleep period.

In one embodiment, the method of the present disclosure further includes: determining the wake-up duration according to a data transmission load and configuring the wake-up duration as being less than the report period when the discontinuous reception period is k times of the report period, wherein k is a positive integer; configuring the first shift time as satisfying 0≤SD<PD; configuring the second shift time as satisfying 0≤SC<mod(SD, PC) or mod(SD+TD, PC)≤SC<PC when mod(SD, PC)<mod(SD+TD, PC) is held; configuring the second shift time SC as satisfying mod(SD+TD, PC)≤SC<mod(SD, PC) when mod(SD, PC)≥mod(SD+TD, PC) is held. One or more embodiments in which the discontinuous reception period is twice as long as the report period (k=2) are given for illustration.

Figure 9A:
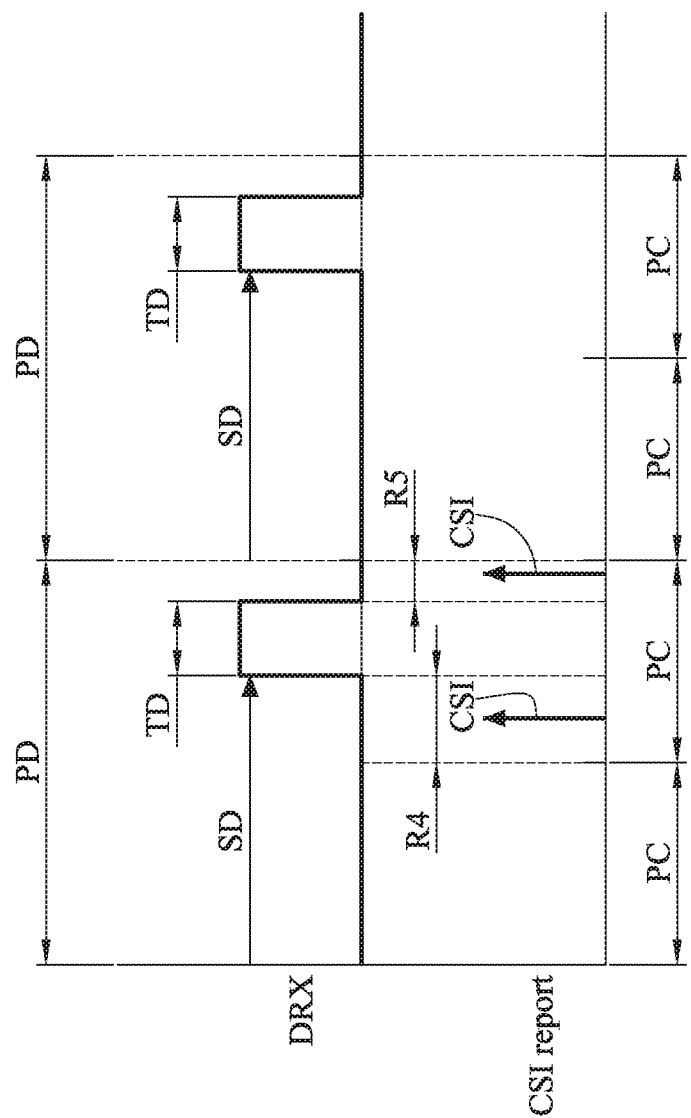
FIG. 9A to FIG. 9B are diagrams of operational waveforms according to different embodiments of the present disclosure.
Figure 9B:
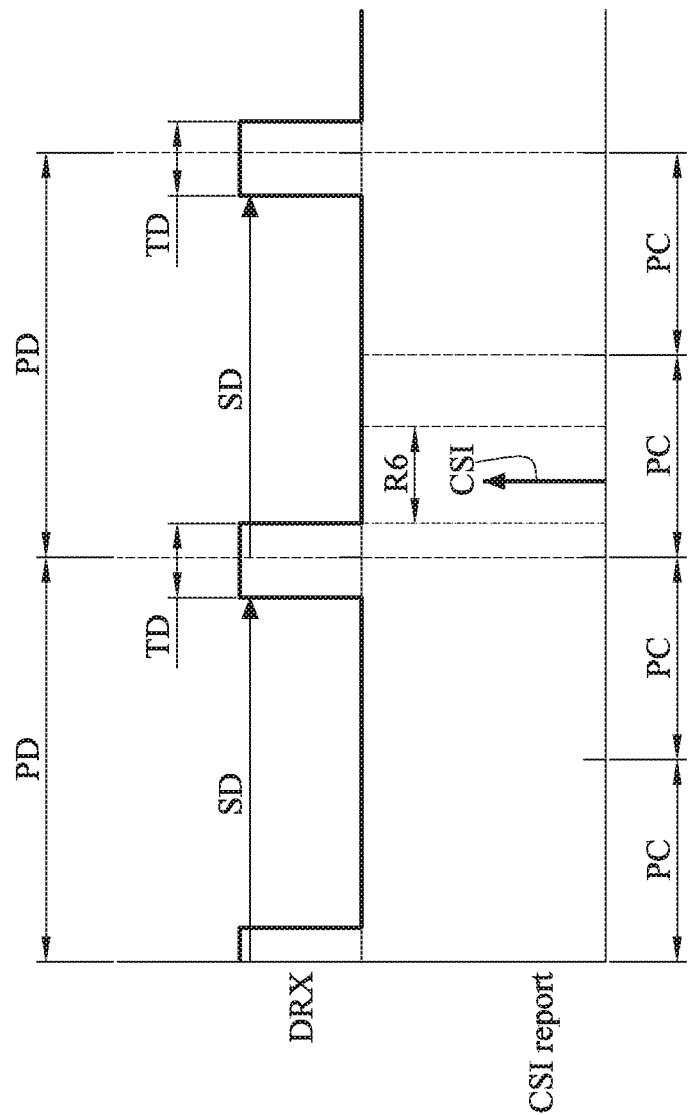

Please refer to FIG. 9A to FIG. 9B, which are diagrams of operational waveforms according to different embodiments of the present disclosure. FIG. 9A illustrates the embodiment in which mod(SD, PC)<mod(SD+TD, PC). As shown in FIG. 9A, for the purpose that the allowable time for the CSI report corresponding to the second shift time SC is not overlapped with the wake-up duration, it is configured such that the second shift time SC is located within a range R4 of 0≤SC<mod(SD, PC), or within a range R5 of mod(SD+TD, PC)≤SC<PC. Accordingly, the occurrence of the CSI report is located in the sleep period. FIG. 9B illustrates the embodiment in which mod(SD, PC)≥mod(SD+TD, PC). As shown in FIG. 9B, for the purpose that the allowable time for the CSI report corresponding to the second shift time SC is not overlapped with the wake-up duration, it is configured such that the second shift time SC is located within a range R6 of mod(SD+TD, PC)≤SC<mod(SD, PC). Accordingly, the occurrence of the CSI report is located in the sleep period.

In one embodiment, the method of the present disclosure further includes: when the report period is k times of the discontinuous reception period, determining the wake-up duration and configuring the wake-up duration as being less than the report period according to a data transmission load; configuring the first shift time as being greater than or equal to 0 and less than the discontinuous reception period; configuring the second shift time as being satisfying PD≤SC<mPD+SD or mPD+SD+TD≤SC<(m+1)PD when a sum of the first shift time and the wake-up duration is less than the discontinuous reception period; configuring the second shift time as satisfying mPD+mod(SD+TD, PD)<SC<mPD+SD when the sum of the first shift time and the wake-up duration is greater than or equal to the discontinuous reception period, wherein k is a positive integer and m is a positive integer less than k. One or more embodiments in which the discontinuous reception period is twice as long as the report period (k=2) are given for illustration.

Figure 10A:
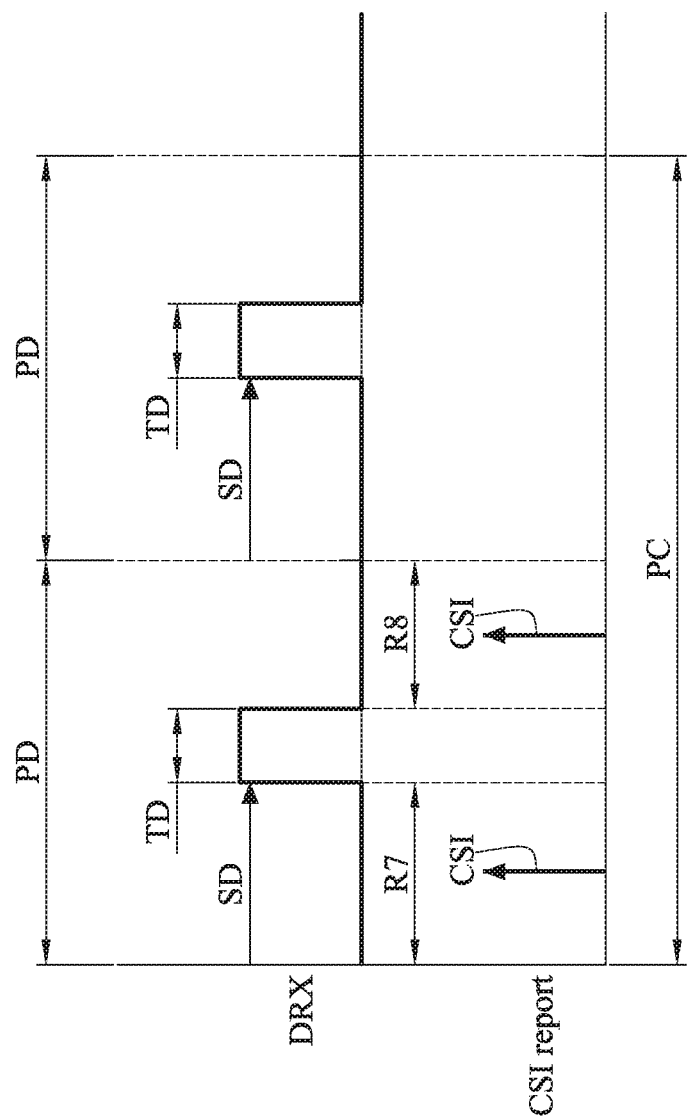
FIG. 10A to 10B are diagrams of operational waveforms according to different embodiments of the present disclosure.
Figure 10B:
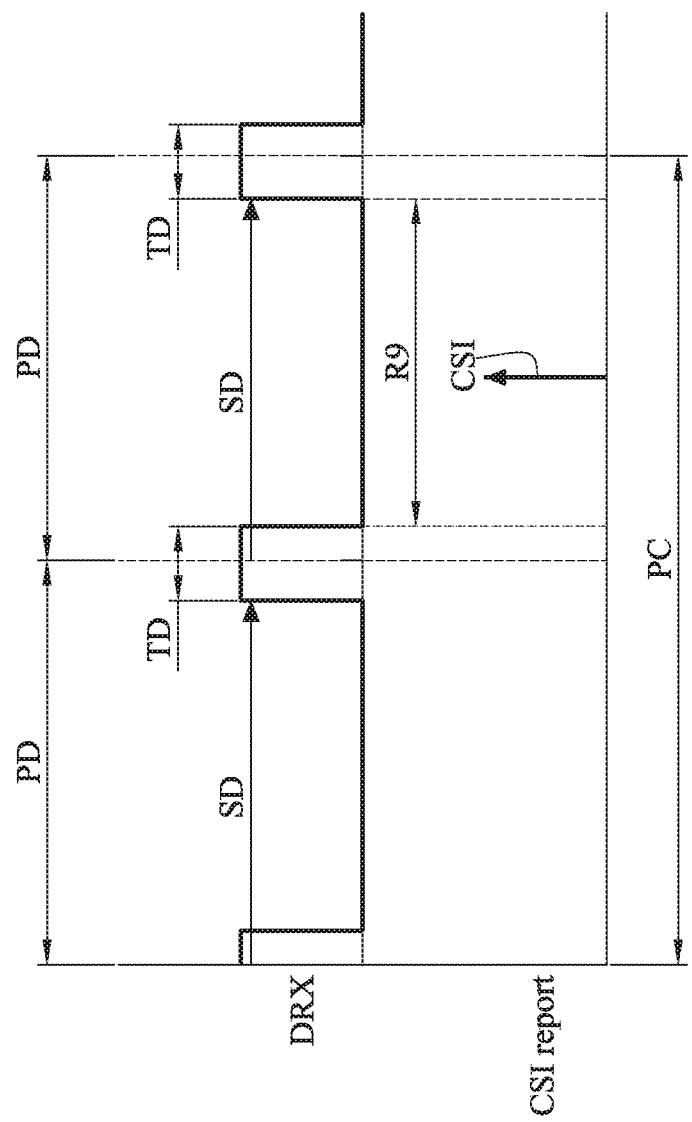

Please refer to FIG. 10A to 10B, which are diagrams of operational waveforms according to different embodiments of the present disclosure. FIG. 10A illustrates the embodiment in which a sum of the first shift time and the wake-up duration is less than the discontinuous reception period. As shown in FIG. 10A, for the purpose that the allowable time for the CSI report corresponding to the second shift time SC is not overlapped with the wake-up duration, it is configured such that the second shift time SC is located in a range R7 of mPD≤SC<mPD+SD, or within a range R8 of mPD+SD+TD<SC<(m+1)PD, wherein m=0,1. FIG. 10B illustrates the embodiment in which a sum of the first shift time and the wake-up duration is greater than or equal to the discontinuous reception period. As shown in FIG. 10B, for the purpose that the allowable time for the CSI report corresponding to the second shift time SC is not overlapped with the wake-up duration, it is configured such that the second shift time SC is located in a range R9 of mPD+mod(SD+TD, PD)<SC<mPD+SD, wherein m=0,1.

Based on the above description, in the base station capable of allocating channel-state report and the method for allocating channel-state report, when predicting that the conflict of CSI report will occur, the base station dynamically allocates the PUCCH resources to the user devices for performing the CSI report by detecting an amount of data in the current queues of the user devices. Furthermore, by configuring the report period and the discontinuous reception period properly, the user device determined to perform the data transmission is allowed to report the CSI, but the rest user devices does not report the CSI. Thereby, the base station and the method for allocating channel-state report raise the efficiency of using PUCCH resources and accordingly the overall demands for the PUCCH resources are reduced.

What is claimed is:

1. A base station capable of allocating channel-state report, comprises a memory, a communication module and a processor communicatively connected to the memory and the communication module, wherein the processor is configured to:
perform a scheduling algorithm to obtain a report period, a report time shift, a plurality of discontinuous reception (DRX) periods each corresponding to a respective one of a plurality of user devices, a plurality of wake-up time shifts each corresponding to a respective one of the user devices, and a plurality of wake-up durations each corresponding to a respective one of the user devices, so that wake-up periods of the user devices are not overlapped with a channel-report time; and
drive the communication module to send a plurality of radio resource control (RRC) messages to the user devices respectively, wherein each of the RRC messages comprises the report period, the report time shift, a piece of physical uplink control channel (PUCCH) resource information, the DRX period corresponding to the user device receiving the RRC message, the wake-up time shift corresponding to the user device receiving the RRC message, and the wake-up duration corresponding to the user device receiving the RRC message, wherein, for the RRC messages sent to the user devices respectively, the report periods are identical to one another, the report time shifts are identical to one another, and the pieces of PUCCH resource information are identical to one another.

2. The base station capable of allocating channel-state report according to claim 1, wherein one of the report period and the DRX period is N times of the other one of the report period and the DRX period, and N is an integer.

3. The base station capable of allocating channel-state report according to claim 1, wherein the processor is further configured to extend one of the wake-up durations to generate a duration of data transmission.

4. A method for allocating channel-state report, comprising:
by a base station, performing a scheduling algorithm to obtain a report period, a report time shift, a plurality of discontinuous reception (DRX) periods each corresponding to a respective one of a plurality of user devices, a plurality of wake-up time shifts each corresponding to a respective one of the user devices, and a plurality of wake-up durations each corresponding to a respective one of the user devices, so that a wake-up period of each of the user devices is not overlapped with a channel-report time; and
by the base station, driving a communication module to send a plurality of radio resource control (RRC) messages to the user devices respectively, wherein each of the RRC messages comprises the report period, the report time shift, a piece of physical uplink control channel (PUCCH) resource information, the DRX period corresponding to the user device receiving the RRC message, the wake-up time shift corresponding to the user device receiving the RRC message, and the wake-up duration corresponding to the user device receiving the RRC message, wherein, for the RRC messages sent to the user devices respectively, the report periods are identical to one another, the report time shifts are identical to one another, and the pieces of PUCCH resource information are identical to one another.

5. The method for allocating channel-state report according to claim 4, wherein one of the report period and the DRX period is N times of the other one of the report period and the DRX period, and N is a positive integer.

6. The method for allocating channel-state report according to claim 4, further comprising: by the base station, extending one of the wake-up durations to generate a duration of data transmission.

7. The method for allocating channel-state report according to claim 4, wherein the wake-up time shifts comprises a first shift time, the report time shift comprises a second shift time, wherein relational equations between the first and second shift times are $$\frac{PD1+SD+TD-SC}{PC} \leq N < \frac{PD2+SD-SC}{PC}, \text{ or } N < \frac{SD-SC}{PC},$$

wherein PD1 stands for an initial point of first discontinuous reception period, PD2 stands for an initial point of second discontinuous reception period, PC stands for the report period, SD stands for the first shift time, SC stands for the second shift time, TD stands for the wake-up duration, N is a non-negative integer.

8. The method for allocating channel-state report according to claim 7, further comprising:

determining the wake-up duration according to a data transmission load when the discontinuous reception period is identical to the report period;

configuring the first shift time as satisfying $0 \leq SD < PD$;

configuring the second shift time as satisfying $0 \leq SC < SD$ or $SD+TD \leq SC < PC$ when a sum of the first shift time and the wake-up duration is less than the report period; and configuring the second shift time as satisfying $mod(SD+TD, PC) \leq SC < SD$ when the sum of the first shift time and the wake-up duration is greater than or equal to the report period.

9. The method for allocating channel-state report according to claim 7, further comprising:

determining the wake-up duration according to a data transmission load and configuring the wake-up duration as being less than the report period when the discontinuous reception period is k times of the report period, wherein k is a positive integer;

configuring the first shift time as satisfying $0 \leq SD < PD$;

configuring the second shift time as satisfying $0 \leq SC < mod(SD, PC)$ or $mod(SD+TD, PC) \leq SC < PC$ when $mod(SD, PC) < mod(SD+TD, PC)$ is held; and configuring the second shift time as satisfying $mod(SD+TD, PC) \leq SC < mod(SD, PC)$ when $mod(SD, PC) \geq mod(SD+TD, PC)$ is held.

10. The method for allocating channel-state report according to claim 7, further comprising:

determining the wake-up duration according to a data transmission load and configuring the wake-up duration as being less than the report period when the report period is k times of the DRX period, wherein k is a positive integer;

configuring the first shift time as being greater than or equal to 0 and less than the DRX period;

configuring the second shift time as satisfying $mPD \leq SC < mPD+SD$ or $mPD+SD+TD < SC < (m+1)PD$ when a sum of the first shift time and the wake-up duration is less than the discontinuous reception period; and configuring the second shift time as satisfying $mPD+mod(SD+TD, PD) < SC < mPD+SD$ when the sum of the first shift time and the wake-up duration is greater than or equal to the discontinuous reception period;

wherein k is a positive integer, and m is a non-negative integer less than k.

* * * * *